(12) United States Patent
Vining et al.

(10) Patent No.: US 10,245,539 B2
(45) Date of Patent: Apr. 2, 2019

(54) VIRTUAL IMPACTOR FILTER ASSEMBLY AND METHOD

(71) Applicant: General Electric Company, Niskayuna, NY (US)

(72) Inventors: William Collins Vining, Niskayuna, NY (US); Robert Francis Manning, Lynn, MA (US); Victor Hugo Silva Correia, Lynn, MA (US); Corey Bourassa, Niskayuna, NY (US); Jared Peter Buhler, Lynn, MA (US); Hojjat Nasr, West Chester, OH (US)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 14/933,749

(22) Filed: Nov. 5, 2015

(65) Prior Publication Data
US 2017/0128867 A1  May 11, 2017

(51) Int. Cl.
| | |
|---|---|
| *B01D 45/00* | (2006.01) |
| *B01D 45/04* | (2006.01) |
| *B01D 50/00* | (2006.01) |
| *B01D 45/08* | (2006.01) |
| *B01D 46/00* | (2006.01) |

(52) U.S. Cl.
CPC ............. *B01D 45/04* (2013.01); *B01D 45/08* (2013.01); *B01D 50/002* (2013.01); *B01D 46/0002* (2013.01); *B01D 46/0004* (2013.01); *B01D 46/0005* (2013.01); *B01D 2265/06* (2013.01)

(58) Field of Classification Search
CPC ...... B01D 45/04; B01D 50/002; B01D 45/08; B01D 45/16; B01D 45/12; G01N 15/0255; G01N 1/2208; G01N 1/2273; G01N 1/4077; A47L 9/1608
See application file for complete search history.

(56) References Cited

U.S. PATENT DOCUMENTS

| | | | | |
|---|---|---|---|---|
| 2,616,563 A | * | 11/1952 | Hebb | B04C 1/00 209/135 |
| 3,007,579 A | * | 11/1961 | Pall | B01D 29/21 210/489 |
| 3,016,984 A | * | 1/1962 | Getzin | B01D 46/06 210/232 |

(Continued)

FOREIGN PATENT DOCUMENTS

CN       104531248 A       4/2015

*Primary Examiner* — Dung H Bui
(74) *Attorney, Agent, or Firm* — Joseph J. Christian

(57) ABSTRACT

A filter system and method use a filter housing that defines an interior chamber and that includes an inlet opening extending into the interior chamber. The outer air flow housing has an outlet conduit through which a flow of air having particles is directed toward the inlet opening of the filter housing along a flow direction toward the interior chamber of the filter housing. The outer air flow housing engages the filter housing such that the filter housing is separated from the outer air flow housing along the flow direction to permit at least some of the air to pass around an exterior of the filter housing and exit the outer air flow housing while the particles in the at least some of the air pass into the interior chamber of the filter housing through the inlet opening.

17 Claims, 4 Drawing Sheets

(56) References Cited

U.S. PATENT DOCUMENTS

| | | | | |
|---|---|---|---|---|
| 3,788,044 | A * | 1/1974 | McNeil | B01D 3/06 55/435 |
| 3,820,310 | A * | 6/1974 | Fromknecht | A47L 7/0038 55/337 |
| 4,217,118 | A * | 8/1980 | Kopf | B01D 46/2411 55/330 |
| 4,303,426 | A * | 12/1981 | Battis | B01D 46/2411 55/498 |
| 4,344,538 | A * | 8/1982 | Fujisawa | B04C 5/103 209/717 |
| 4,689,052 | A | 8/1987 | Ogren et al. | |
| 5,498,271 | A | 3/1996 | Marple et al. | |
| 5,669,948 | A * | 9/1997 | Brottgårdh | B01D 19/0057 55/459.1 |
| 6,168,647 | B1 * | 1/2001 | Perry, Jr. | B01D 45/02 55/319 |
| 6,589,314 | B1 | 7/2003 | Page et al. | |
| 6,599,342 | B2 * | 7/2003 | Andress | B01D 46/0024 123/198 E |
| 6,698,592 | B2 | 3/2004 | Kenning et al. | |
| 7,381,234 | B2 * | 6/2008 | Oh | A47L 9/1608 55/318 |
| 7,422,615 | B2 * | 9/2008 | Kim | A47L 9/1608 55/426 |
| 7,662,203 | B2 * | 2/2010 | Scott | B01D 46/0001 55/498 |
| 7,669,457 | B2 | 3/2010 | Griffith et al. | |
| 7,967,901 | B2 * | 6/2011 | Sakatani | B01D 45/12 55/459.1 |
| 8,573,034 | B2 | 11/2013 | Grant et al. | |
| 8,626,467 | B2 | 1/2014 | Fang | |
| 8,733,185 | B2 | 5/2014 | Solomon | |
| 8,857,383 | B2 | 10/2014 | Pendray | |
| 8,978,199 | B2 * | 3/2015 | Kasper | A47L 9/104 15/347 |
| 9,035,242 | B2 | 5/2015 | Caldow et al. | |
| 2003/0106292 | A1 * | 6/2003 | Kitano | B01D 45/12 55/396 |
| 2003/0177906 | A1 * | 9/2003 | Jones | B01D 45/06 95/273 |
| 2007/0214756 | A1 * | 9/2007 | Lee | A47L 9/165 55/419 |
| 2009/0126514 | A1 | 5/2009 | Burroughs et al. | |
| 2009/0193771 | A1 * | 8/2009 | Oh | A47L 9/1633 55/337 |
| 2010/0018174 | A1 * | 1/2010 | Komatsu | B01D 46/0005 55/480 |
| 2010/0154371 | A1 * | 6/2010 | Bittle | B01D 46/2411 55/502 |
| 2011/0036770 | A1 * | 2/2011 | Jokschas | B01D 29/21 210/440 |
| 2013/0205726 | A1 * | 8/2013 | Wada | B01D 46/003 55/337 |
| 2013/0255203 | A1 * | 10/2013 | Muenkel | B01D 46/0021 55/337 |
| 2015/0251120 | A1 * | 9/2015 | Jakop | B01D 46/0005 55/496 |
| 2016/0123154 | A1 | 5/2016 | Manning et al. | |
| 2017/0107852 | A1 | 4/2017 | Nasr et al. | |

* cited by examiner

VIRTUAL IMPACTOR FILTER ASSEMBLY AND METHOD

FIELD

Embodiments of the inventive subject matter described herein relate to filter assemblies (such as virtual impactor filter assemblies) that remove particles from a flow of gas, such as air.

BACKGROUND

Various mechanical systems have air or other gases flowing through the systems. The air flow (which, unless otherwise noted, can refer to the flow of air or other gases) can be used to cool the systems or provide other functions to the systems. For example, turbine engines may receive air flows to cool and/or cause the systems to operate. In some environments, the air flow may include particles, such as dirt, sand, or the like. There may be a sufficient amount of particles in the air flow that the particles can build up in the mechanical systems and impede or degrade performance of the systems or, in some circumstances, prevent the mechanical systems from operating.

In order to prevent the particles from degrading operation of the mechanical system, a filter may be disposed along the air flow path upstream of the mechanical system. The air flow may pass through the filter and the filter may retain or otherwise remove particles from the air flow. One problem with such a filter, however, is that the filter may eventually become clogged with the particles. The clogged filter may not allow additional air to pass through the filter. As a result, the air flow cannot pass through to the mechanical system that relies on the air flow to operate.

Additionally, some filters may receive the air flow such that the particles retained by the filter unevenly build up in one or more locations of the filter. For example, one section of the filter may retain more particles than another section of the filter. During movement or vibration of the filter (e.g., which may be caused by operation of the mechanical system), the buildup of particles in one section of the filter may fall out of the filter into one or more areas of the mechanical system. This can cause damage or prevent the mechanical system from operating.
the mechanical system. This can cause damage or prevent the mechanical system from operating.

BRIEF DESCRIPTION

In one embodiment, a virtual impactor filter assembly includes a filter housing configured to hold a filter material and defining an interior chamber. The filter housing includes an inlet opening positioned relative to an outer air flow housing that directs a flow of air having particles along a flow direction into the interior chamber of the filter housing through the inlet opening. The filter housing is configured to engage with the outer air flow housing such that the filter housing is separated from the outer air flow housing along the flow direction to permit at least some of the air to pass around an exterior of the filter housing and exit the outer air flow housing while the particles in the at least some of the air pass into the interior chamber of the filter housing through the inlet opening.

In one embodiment, a filter system includes a filter housing and an outer air flow housing. The filter housing defines an interior chamber and includes an inlet opening extending into the interior chamber. The outer air flow housing has an outlet conduit through which a flow of air having particles is directed toward the inlet opening of the filter housing along a flow direction toward the interior chamber of the filter housing. The outer air flow housing engages the filter housing such that the filter housing is separated from the outer air flow housing along the flow direction to permit at least some of the air to pass around an exterior of the filter housing and exit the outer air flow housing while the particles in the at least some of the air pass into the interior chamber of the filter housing through the inlet opening.

In one embodiment, a method includes receiving a flow of air having particles from an outer air flow housing along a flow direction. The flow of air is directed toward an inlet opening of a filter housing that directs the particles into the filter housing. The method also can include removing at least some of the particles from the flow of air by passing the air through a filter medium inside the filter housing and, responsive to the filter medium becoming laden with the particles such that the flow of air through the filter medium would be reduced, separating the particles from the flow of air such that momentum of the particles along the flow direction from the outer air flow housing carries the particles into the filter housing while the flow of air passes outside of the filter housing.

BRIEF DESCRIPTION OF THE DRAWINGS

Reference is now made briefly to the accompanying drawings, in which.

DETAILED DESCRIPTION

One or more embodiments of the inventive subject matter described herein provide a virtual impactor filter assembly and method that can be used with systems such as an engine (such as an aircraft engine or other engine). Alternatively, the virtual impactor filter assembly and method can be used with another system. The virtual impactor filter assembly captures and removes particles from an air stream while maintaining air flow through the assembly in order to allow the air flow to continue moving through the virtual impactor filter assembly to a mechanical system that receives the air flow. The continued flow of air can allow the mechanical system to continue operating even if the virtual impactor filter assembly becomes clogged.

The virtual impactor filter assembly may be offset from a source of the air flow to enable flow assurance when the virtual impactor filter assembly is full. For example, an inlet to the virtual impactor filter assembly may be spaced apart from an outlet through which the air flow is directed toward the virtual impactor filter assembly. This spacing between the inlet of the virtual impactor filter assembly and the outlet of the source of the air flow can allow the air to flow around (and not through) the virtual impactor filter assembly when the virtual impactor filter assembly becomes full or clogged with particles (such that the air cannot flow through a filter medium of the virtual impactor filter assembly). Particles in the air flow may continue to enter into the filter medium in the virtual impactor filter assembly through the inlet of the virtual impactor filter assembly due to the momentum of the particles, while the air flows around the virtual impactor filter assembly. Optionally, the spacing between the inlet of the virtual impactor filter assembly and the outlet of the source of the air flow may be bridged by a conduit having one or more holes that allow the air to flow around the virtual impactor filter assembly while the particles continue to enter into the virtual impactor filter assembly.

The virtual impactor filter assembly may include a channel to prevent backflow of the particles out of the virtual impactor filter assembly and/or an impingement surface that prevents the uneven collection of particles in locations that are aligned with the inlet into the virtual impactor filter assembly. As described herein, this impingement surface can more evenly distribute the particles onto the filter medium inside the virtual impactor filter assembly than a virtual impactor filter assembly without the impingement surface. The impingement surface can distribute the particles onto the filter medium in locations that prevent the particles from exiting from the virtual impactor filter assembly (e.g., through the inlet of the virtual impactor filter assembly).

Figure 1:
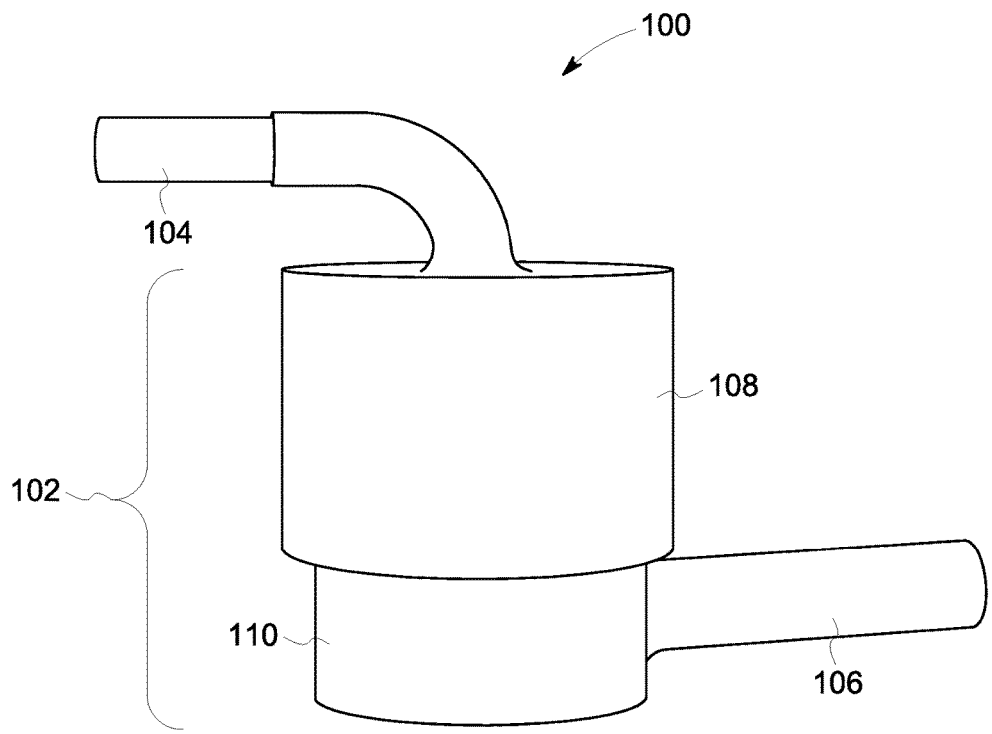
FIG. 1 illustrates a virtual impactor filter system according to one embodiment.

FIG. 1 illustrates a virtual impactor filter system 100 according to one embodiment. The filter system 100 includes an outer air flow housing 102 having an outlet conduit 104 through which air flows into the outer air flow housing 102 from a source, such as a cyclonic separator, a fan, or the like. The conduit 104 is referred to as an outlet conduit in that the air flows out of the conduit 104 into a virtual impactor filter assembly described and shown herein. The air flowing through the outlet conduit 104 includes particles that are removed from the air flow by the virtual impactor filter assembly disposed inside the filter system 100. The air flowing into, through, and/or around the virtual impactor filter assembly inside the filter system 100 can exit out of the filter system 100 through an exit conduit 106. The exit conduit 106 may be fluidly coupled with a mechanical system that receives the air flow that is filtered by the filter system 100. For example, the filtered air flow may exit out of the filter system 100 to an engine or other system via the exit conduit 106.

Figure 2:
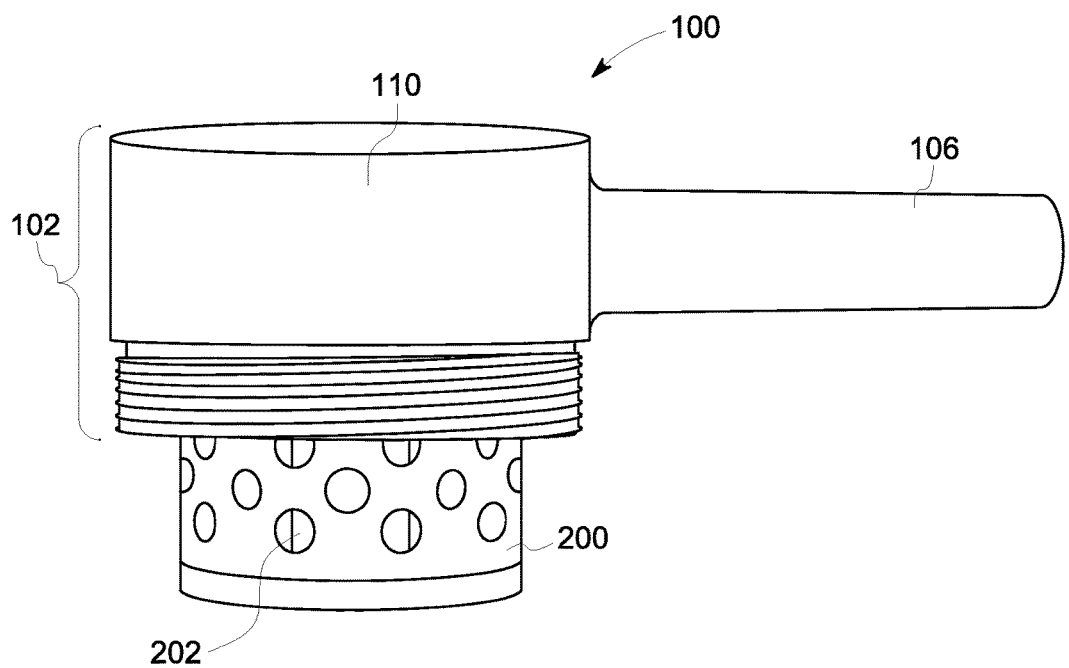
FIG. 2 illustrates the filter system shown in FIG. 1 with a base of an outer air flow housing shown in FIG. 1 removed according to one embodiment.

The outer air flow housing 102 includes a base housing 108 and a cap 110. The virtual impactor filter assembly can be coupled with the base housing 108, the cap 110, or both the base housing 108 and the cap 110 to secure the virtual impactor filter assembly inside the outer air flow housing 102. The cap 110 can be coupled with the base housing 108 to enclose the virtual impactor filter assembly inside the outer air flow housing 102. The base housing 108 includes the outlet conduit 104 while the cap 110 includes the exit conduit 106. Alternatively, the outer air flow housing 102 may not include the cap 110, as shown in FIG. 2. For example, the air flow exiting out of the outer air flow housing 102 may pass through and/or around the virtual impactor filter assembly and out of the outer air flow housing 102 through an area where the cap 110 is shown in FIG. 1.

FIG. 2 illustrates the filter system 100 shown in FIG. 1 with the base 108 of the outer air flow housing 102 removed according to one embodiment. A virtual impactor filter assembly 200 is visible in FIG. 2. The virtual impactor filter assembly 200 is connected with the base housing 108, but may not be coupled or engaged with the cap 110 (shown in FIG. 1). For example, the virtual impactor filter assembly 200 may have a threaded connection or other type of connection with the base housing 108, but does not engage and is not connected with the cap 110 in one embodiment. Alternatively, the virtual impactor filter assembly 200 may be connected with or otherwise engage the cap 110.

The virtual impactor filter assembly 200 has a cylindrical shape with several exit openings 202 extending through the walls forming the virtual impactor filter assembly 200. A filter medium (not shown in FIG. 2) may be placed inside or outside the virtual impactor filter assembly 200. Air can flow into the interior of the virtual impactor filter assembly 200, through the filter medium, and out of the virtual impactor filter assembly 200 through the exit openings 202, with the filter medium capturing particles in the air flow to filter the air flow. The filtered air flow may then exit from the filter system 100 through the exit conduit 106 (in an embodiment that includes the cap 110) or out of the open end of the outer air flow housing 102 (in an embodiment that does not include the cap 110). Additionally or alternatively, the filter housing 300 may be formed from a material that filters the air. For example, the filter housing 300 may be formed from material, such as one or more sintered metal alloys, that capture particles from the air while allowing the air to pass through the filter housing 300. In such an embodiment, the filter housing 300 may not include the openings 202.

Additionally or alternatively, the cap 110 may include one or more holes to allow the filtered air to exit. As described herein, if the air is unable to flow through the filter medium in the virtual impactor filter assembly 200 (e.g., due to clogging of the filter medium), then the air flow may pass around the outside of the virtual impactor filter assembly 200 and then exit from the filter system 100 through the exit conduit 106 (in an embodiment that includes the cap 110) or out of the open end of the outer air flow housing 102 (in an embodiment that does not include the cap 110). Particles in the air flow may still be captured by the virtual impactor filter assembly 200 even if the air in which the particles travel passes around the virtual impactor filter assembly 200, as described herein.

Figure 3:
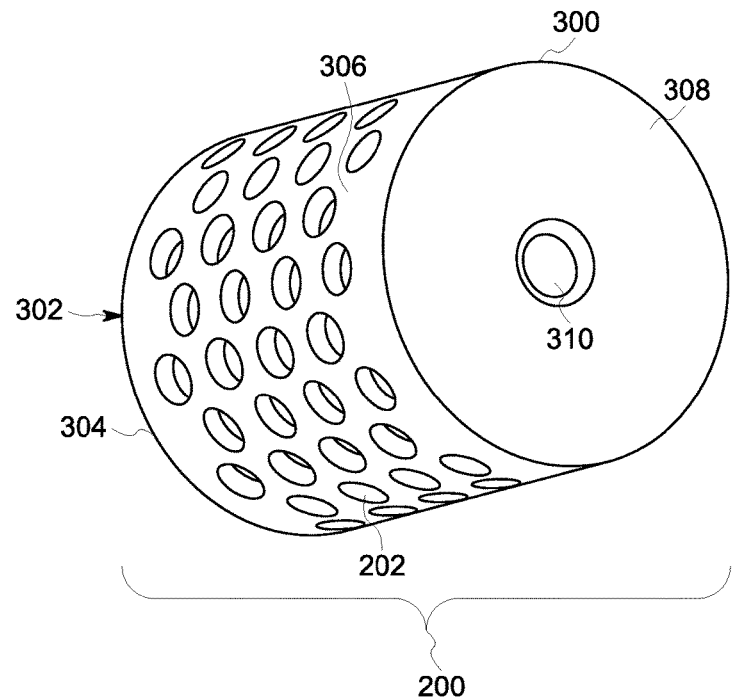
FIG. 3 illustrates a perspective view of a virtual impactor filter assembly shown in FIG. 2 according to one embodiment.

FIG. 3 illustrates a perspective view of the virtual impactor filter assembly 200 shown in FIG. 2 according to one embodiment. The virtual impactor filter assembly 200 includes a filter housing 300 that defines an interior chamber 302. In the illustrated embodiment, the filter housing 300 has a cylindrical shape formed by a circular end wall 304 and a cylindrical side wall 306 that extends around an outer perimeter or circumference of the end wall 304. The side wall 306 extends from the end wall 304 to an opposite circular impingement end 308. Alternatively, the virtual impactor filter assembly 200 may have another shape, such as a cuboid, cube, etc.

The side wall 306 may include the exit openings 202 through which air flows through the virtual impactor filter assembly 200. Additionally or alternatively, the impingement end 308 and/or the circular end wall 304 of the filter housing 300 may include one or more exit openings 202. The end wall 304 may face the outlet conduit 306 through which the air flow is directed to the virtual impactor filter assembly 200. The end wall 304 includes an inlet opening 310 that provides access into the filter housing 300. The inlet opening 310 may be aligned with the outlet conduit 106 so that the direction in which the air flows into the filter system 100 (shown in FIG. 1) from the outlet conduit 106 is directed or aligned with the inlet opening 310. In the illustrated embodiment, the end wall 304 does not include any exit openings 202 and only includes the inlet opening 310.

Figure 4:
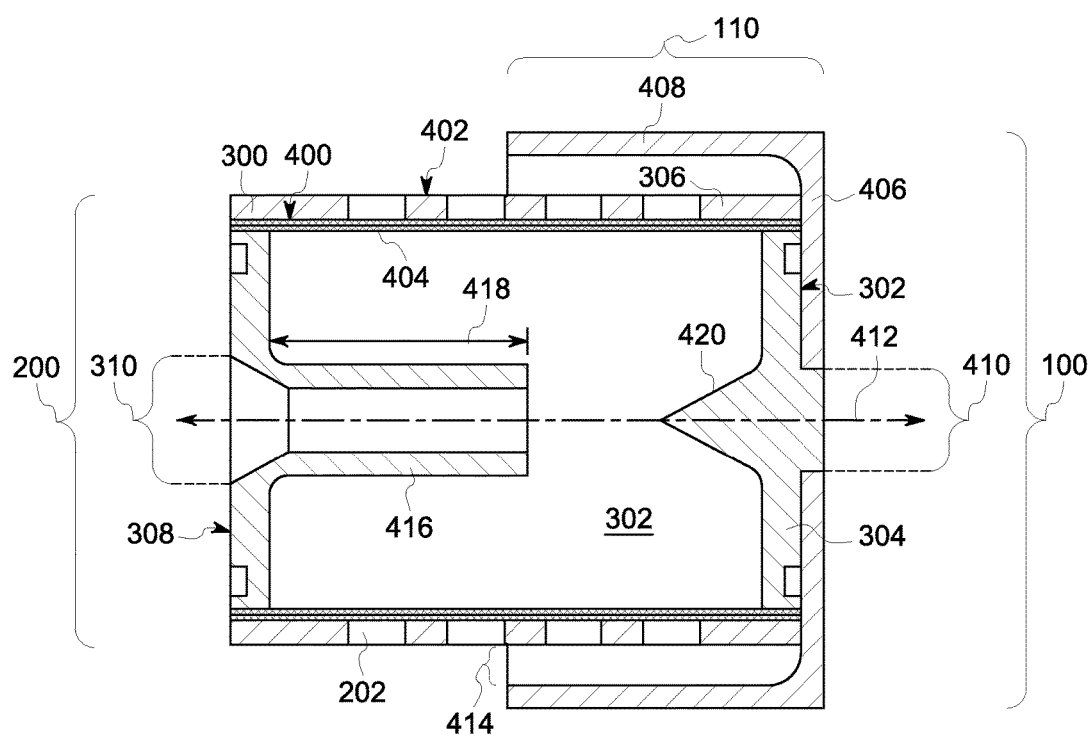
FIG. 4 illustrates a cross-sectional view of the filter system shown in FIG. 1 with a base housing of the outer air flow housing also shown in FIG. 1 removed according to one embodiment.

FIG. 4 illustrates a cross-sectional view of the filter system 100 shown in FIG. 1 with the base housing 108 of the outer air flow housing 102 removed according to one embodiment. The filter housing 300 of the virtual impactor filter assembly 200 includes opposite inner and outer surfaces 400, 402. A filter medium 404 is disposed inside the filter housing 300 along the inner surface 400 of the side wall 306 of the filter housing 300. The filter medium 404 may be formed as a conduit of air permeable material that extends around the interior chamber 302 of the filter housing 300 along the inner surface 400 of the side wall 306 of the filter housing 300. For example, the filter medium 404 may be a web of sponge material or other material that allows air to pass there through while trapping particles in the filter medium 404. The filter medium 404 may be pleated or consist of an alternative geometry as to increase the filtration surface area. Alternatively, the filter medium 404 may be part of the side wall 306 of the filter housing 300. For example, the side wall 306 may be formed from a material that allows the air to flow through the side wall 306 while capturing and retaining particles from the air flow. Such a material may include sintered metal powder or another material. In the illustrated embodiment, the filter medium 404 does not extend across either of the end walls 304, 308 of the filter housing 300. Alternatively, the filter medium 404 extends across at least one of the end walls 304, 308.

In the illustrated embodiment, the filter housing 300 is engaged with the cap 110 of the outer air flow housing 102. Alternatively, the cap 110 may not be included in the outer air flow housing 102 and/or the filter housing 300 may not be engaged with the outer air flow housing 102. The cap 110 may have a cylindrical shape formed by a circular end wall 406 and a cylindrical side wall 408 that extends around the outer perimeter or circumference of the end wall 406. Alternatively, the cap 110 may have another shape. The cap 110 includes an opening 410 in the end wall 406 through which the end wall 302 of the filter housing 300 extends. Alternatively, the cap 110 may not include the opening 410. In one embodiment, the portion of the filter housing 300 that extends into the opening 410 may have threads or the cap 110 may include threads within the opening 410 to provide a threaded connection between the filter housing 300 and the cap 110. Alternatively, the filter housing 300 and cap 110 may be connected in another way, in another location, and/or may not be connected. Although not visible in FIG. 4, the exit conduit 106 (shown in FIG. 1) of the outer air flow housing 102 (shown in FIG. 1) may be connected with the side wall 408 of the cap 110. As shown in FIG. 4, the filter housing 300 and the cap 110 may be symmetrical or have a symmetric shape about (e.g., around) a center axis 412. Alternatively, the filter housing 300 and/or cap 110 may be asymmetrical or have an asymmetric shape about the axis 412. As one example, the axis 412 may be disposed to one side of the filter housing 300 and/or cap 110 relative to the position shown in FIG. 4.

The side wall 408 of the cap 110 may be laterally spaced apart from the side wall 306 of the filter housing 300 to define a volume where air exiting the exit holes 202 of the filter housing 300 and/or air passing around the exterior of the filter housing 300 may flow. In the illustrated embodiment, the cap 110 does not include openings or holes in the side wall 408 of the cap 110. Instead, the air flowing out and/or around the filter housing 300 may exit out of the cap 110 through the exit conduit 106 and/or through an opening 414 between the side walls 306, 408 of the filter housing 300 and the cap 110. Alternatively, the cap 110 may include one or more holes or openings through the side wall 408 and/or end wall 406 of the cap 110 to permit air flowing out of and/or around the filter housing 300 to pass through and out of the cap 110 and the outer air flow housing 102.

The filter housing 300 includes a backflow prevention conduit 416 extending inward from the inlet opening 310 of the filter housing 300. The backflow prevention conduit 416 has a length dimension 418 that extends into the interior chamber 302 of the filter housing 300. The backflow prevention conduit 416 is symmetric about (e.g., around) the center axis 412 in the illustrated embodiment. For example, the backflow prevention conduit 416 may be straight or linear. Alternatively, the backflow prevention conduit 416 may not be symmetric about the center axis 412 and/or may not be straight or linear. For example, the backflow prevention conduit 416 may have a bent or curved shape.

The backflow prevention conduit 416 prevents particles received into the filter housing 300 from escaping out of the filter housing 300 through the inlet opening 310. The air flow from the outlet conduit 104 (shown in FIG. 1) of the outer air flow housing 102 is directed along the axis 412 toward the backflow prevention conduit 416. For example, the outlet of the outlet conduit 104 may be aligned with the inlet opening 310 of the filter housing 300 such that the air and/or particles in the air flow along a direction oriented along the axis 412, as described in more detail below. The backflow prevention conduit 416 extends into the filter housing 300 to prevent particles captured inside the filter housing 300 and/or the air entering into the filter housing 300 from exiting back through the backflow prevention conduit 416. Without the inwardly extending backflow prevention conduit 416, the particles in the filter housing 300 may exit the housing through the opening 310 if the particles were to become dislodged from the filter medium 404 due to vibrations or irregular fluid flows. For example, the conduit 416 provides a pathway out of the filter housing 300 that is more resistant to the flow of particles, especially when the filter is positioned with the hole 310 pointing down in the direction of gravity.

In the illustrated embodiment, the end wall 304 of the filter housing 300 includes an angled impingement surface 420. The impingement surface 420 projects inward from the end wall 304 into the interior chamber 302 of the filter housing 300. The impingement surface 420 may have a conical shape that is aligned with and symmetrical about the axis 412. For example, the point of the conical shape formed by the impingement surface 420 may be aligned with and oriented along the axis 412 toward the backflow prevention conduit 416 and the inlet opening 310 of the filter housing 300. Alternatively, the impingement surface 420 may have another shape or may be oriented differently. For example, the impingement surface 420 may be a flat surface that is transversely oriented with respect to the axis 412. As described below, the impingement surface 420 assists in distributing the particles around the interior chamber 302 of the filter housing 300 to help in preventing uneven buildup of the particles in one or more locations on the filter medium 404 and/or to help in preventing the particles from exiting the interior chamber 302 of the filter housing 300 via the backflow prevention conduit 416.

Figure 5:
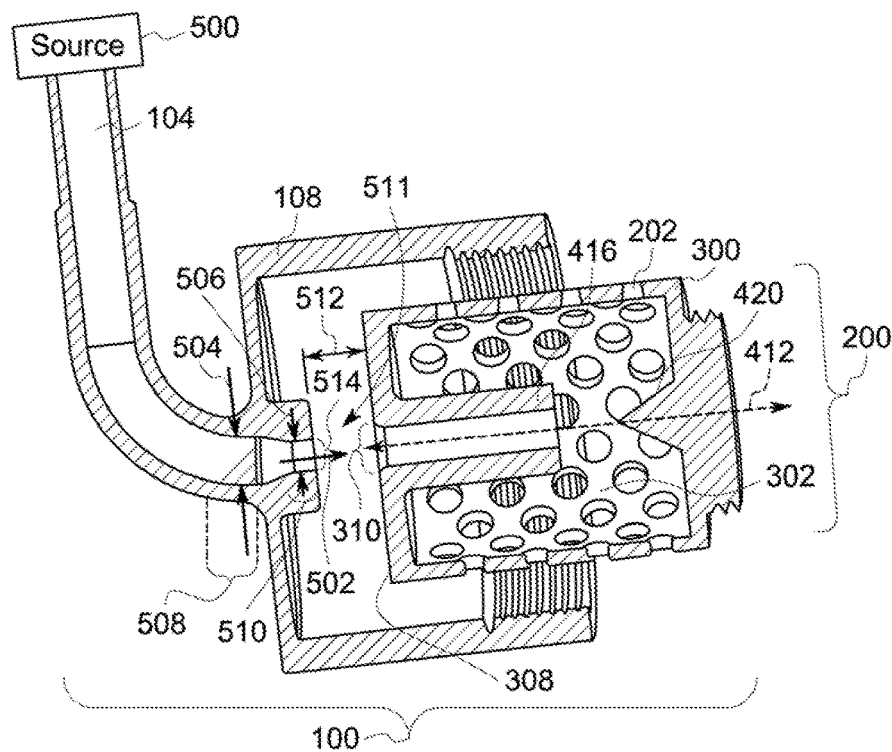
FIG. 5 illustrates another cross-sectional view of the filter system with the cap of the outer air flow housing shown in FIG. 1 removed according to one embodiment.

FIG. 5 illustrates another cross-sectional view of the filter system 100 with the cap 110 of the outer air flow housing 102 shown in FIG. 1 removed according to one embodiment. The filter medium 404 shown in FIG. 4 is not shown in FIG. 5. The virtual impactor filter assembly 300 may not be engaged with the base housing 108 of the outer air flow housing 102. The outlet conduit 104 of the outer air flow housing 102 is fluidly coupled with a source 500 of air flow, such as a cyclonic separator, an exhaust of a powered system (e.g., an engine), or the like.

Particle-laden air flows along the outlet conduit 104 and exits the outlet conduit 104 along a flow direction 502. The flow direction 502 may or may not be coincident with the axis 412 of the virtual impactor filter assembly 200 shown in FIG. 4. For example, the flow direction 502 may be oriented along the axis 412 or the flow direction 502 may not be aligned with the axis 412. The outlet conduit 104 is aligned with the inlet opening 310 of the filter housing 300 along the flow direction 502 to cause the air and particles to flow toward the inlet opening 310.

In the illustrated embodiment, the outlet conduit 104 is staged in inner diameter along the flow direction 502 to generate a jet stream of the air flow exiting the outlet conduit 104 through an outlet opening 514 of the outlet conduit 104. For example, the outlet conduit 104 may have different inner diameters 504, 506 at different locations along the length of the outlet conduit 104. While the conduits shown in the Figures have cylindrical and/or symmetrical shapes, alternatively, one or more of the conduits may have a non-cylindrical and/or asymmetric shape. In the illustrated embodiment, the inner diameters 504, 506 define different stages 508, 510 of the outlet conduit 104, with the stage 508 being upstream of the stage 510 along the flow direction 502. The inner diameter of the outlet conduit 104 becomes smaller as the particle-laden air gets closer to the virtual impactor filter assembly 200. The reducing inner diameter of the outlet conduit 104 can form a jet stream of the particle-laden air. This jet stream can increase the momentum of the air and the particles relative to the air and/or particles inside the base housing 108 of the outer air flow housing 102. As described below, this increased momentum can assist in ensuring that the particles in the air flow are entrapped in the filter housing 300 of the virtual impactor filter assembly 200 even when the filter medium 404 in the filter housing 300 becomes clogged or full.

The inlet opening 310 and the end wall 308 of the filter housing 300 that faces the outlet conduit 104 of the outer air flow housing 102 are spaced apart from the outlet conduit 104 in the illustrated embodiment. The inlet opening 310 may be spaced apart from the opening of the outlet conduit 104 through which the air exits the outlet conduit 104 by a separation distance 512. In the illustrated embodiment, an air gap 511 is defined in the separation distance 512 between the inlet, opening 310 of the filter housing 300 and the outlet opening 514 of the outlet conduit 104. Alternatively and as described below, one or more objects or components may be disposed in the separation distance 512 between the inlet opening 310 of the filter housing 300 and the outlet opening 514 of the outlet conduit 104.

In operation, particle-laden air flows from the source 500 and through the outlet conduit 104. This air flow can be converted into a jet stream of particle-laden air by the decreasing inner diameters of the outlet conduit 104 upstream of the outlet opening 514 of the outlet conduit 104. The particle-laden air flows out of the outlet opening 514 and into the base housing 108 of the outer air flow housing 102 along the flow direction 502.

If the air is able to enter into the interior chamber 302 of the filter housing 300 (which can occur if the filter medium 404 is not clogged), then the air and particles in the air can flow across the separation gap between the outlet opening 514 and the inlet opening 310 and enter into the filter housing 300 through the backflow prevention conduit 416. This air flows through the backflow prevention conduit 416 and into the interior chamber 302 of the filter housing 300. Particles in the air may have sufficient momentum to strike the impingement surface 420 of the filter housing 300. This surface 420 can deflect the particles in angled directions (e.g., directions that are transversely or acutely oriented with respect to the axis 412) toward the filter medium 404 (not shown in FIG. 5) and/or inner surface of the side wall of the filter housing 300. This angled deflection prevents the particles from being deflected back into the backflow prevention conduit 416 (and out of the filter housing 300). Additionally, the angled deflection can more evenly distribute the buildup of particles along the filter medium 404 and/or side wall of the filter housing 300 than if the filter housing 300 did not include the surface 420. The angled deflection can also prevent the deposition of particles on the face of the impingement surface 420. The particles are removed from the air by the filter medium 404. The filtered air may flow through the filter medium 404 and out of the filter housing 300 through the openings 202 in the filter housing 300. The filtered air may then flow out of the outer air flow housing 102 through the gap between the cap 110 (shown in FIG. 1) and the virtual impactor filter assembly 200, through one or more openings in the cap 110, and/or through the exit conduit 106. This filtered air may be directed to a system (e.g., a turbine engine or other engine) that uses the filtered air, such as for cooling.

Over time, the filter medium 404 may become clogged with the particles in the air. As a result, the air flowing into the outer air flow housing 102 from the outlet conduit 104 may not be able to flow into the interior chamber of the filter housing 300. For example, the clogged filter medium 404 may block the air from flowing through the filter medium 404 and out of the openings 202 in the filter housing 300. The virtual impactor filter assembly 200 can continue removing particles from the air exiting the outlet conduit 104. The momentum of the particles in the air exiting the outlet conduit 104 may be sufficiently large that the particles move along the flow direction 502 and into the interior chamber 302 of the filter housing 300 through the backflow prevention conduit 416 even if the air in which the particles travel does not enter into the filter housing 300.

The particles may be propelled into the filter housing 300 and captured inside the filter housing 300 while the air flow around the exterior of the virtual impactor filter assembly 200 between the filter housing 300 and the outer air flow housing 102. This air (with the particles removed) can flow out of the outer air flow housing 102 through the gap between the cap 110 and the virtual impactor filter assembly 200, through one or more openings in the cap 110, and/or through the exit conduit 106. The separation distance 512 between the outlet opening 514 of the outlet conduit 104 and the inlet opening 310 of the filter housing 300 may be sufficiently large to allow the air to flow around the filter housing 300 but also be sufficiently small to cause momentum of the particles in the air to enter into the filter housing 300 through the inlet opening 310 of the filter housing 300. This filtered air may be directed to a system (e.g., a turbine engine or other engine) that uses the filtered air, such as for cooling. The air may flow around the virtual impactor filter assembly 200 with the particles being removed from the air without decreasing the rate of air flow through the outer air flow housing 102 (relative to the air flowing through the filter medium 404 of the virtual impactor filter assembly 200).

Figure 6:
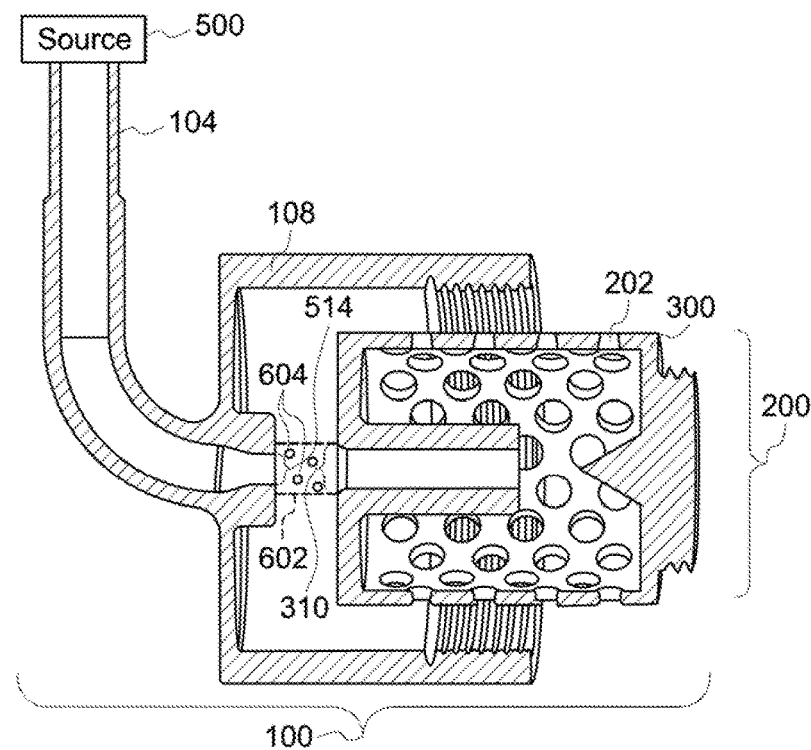
FIG. 6 illustrates another cross-sectional view of the filter system with the cap of the outer air flow housing shown in FIG. 1 removed according to another embodiment.

FIG. 6 illustrates another cross-sectional view of the filter system 100 with the cap 110 of the outer air flow housing 102 shown in FIG. 1 removed according to another embodiment. The filter medium 404 shown in FIG. 4 is not shown in FIG. 6. In the illustrated embodiment and in contrast to the filter system 100 shown in FIG. 5, the virtual impactor filter assembly 200 includes a bridge conduit 602 that extends from the outlet opening 514 of the outlet conduit 104 to the end wall 308 of the filter housing 300. The bridge conduit 602 provides a fluid connection between the outlet conduit 104 and the inlet opening 310 of the filter housing 300 in order to assist in directing air and particles horn the outlet conduit 104 to the backflow prevention conduit 416 of the virtual impactor filter assembly 200. The bridge conduit 602 may concurrently engage both the filter housing 300 and the base housing 108 of the outer air flow housing 102, as shown in FIG. 6. In another embodiment, the filter housing 300 may be secured in another manner, such as by spokes radially extending around the outer circumference or perimeter of the filter housing 300 that connect the filter housing 300 to the outer air flow housing, an attachment similar to a hot air balloon where the filter housing 300 is in the location of the balloon and the exit of the outlet conduit 104 is the basket connected to the balloon, or the like.

The bridge conduit 602 may allow the air to flow around the filter housing 300 when the filter medium 404 of the virtual impactor filter assembly 200 is clogged or is otherwise unable to allow air to flow through the filter housing 300. The bridge conduit 602 includes one or more openings 604 extending through the thickness of the bridge conduit 602. These openings 604 allow air to flow out of the bridge conduit 602 before reaching the inlet opening 310 of the filter housing 300 while the momentum of particles in the air continue to travel into the filter housing 300 via the conduit 602 and the inlet opening 310. This air may flow around the virtual impactor filter assembly 200 with the particles being removed from the air without decreasing the rate of air flow through the outer air flow housing 102 (relative to the air flowing through the filter medium 404 of the virtual impactor filter assembly 200).

The filter systems described herein can filter particle-laden air by passing the air through a filter medium to capture particles from the air and, when the filter medium begins impeding or blocking the flow of air through the filter medium, by passing the air around the virtual impactor filter assembly with the momentum of the particles separating the particles from the air and directing the particles into the virtual impactor filter assembly. As a result, the rate of air flow through the filter system does not decrease or does not significantly decrease (e.g., decrease by more than 1%, 5%, 10%, or the like) while the particles are removed from the air, even in situations where the filter medium becomes clogged. The filter systems may be passive devices that are not powered. For example, in contrast to some known filters, the filter systems described herein may not include a vacuum or pump to remove the particles from the air.

Figure 7:
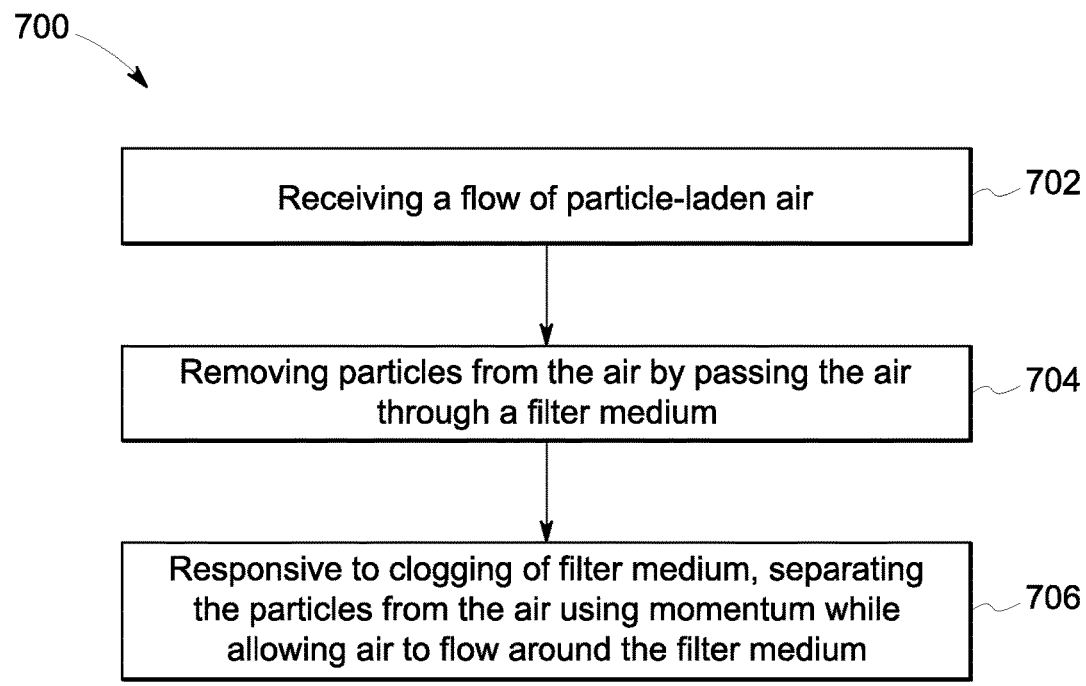
FIG. 7 illustrates a flowchart of one embodiment of a method for filtering particle-laden air.

FIG. 7 illustrates a flowchart of one embodiment of a method 700 for filtering particle-laden air. The method 700 may be performed by one or more embodiments of the filter systems described herein. At 702, particle-laden air is received. This air may be received from a source such as a cyclonic separator, an exhaust, or the like. The air is directed toward an inlet opening into a filter housing as described herein. The filter housing may be separated from an outlet conduit that supplies the air by an air gap or may be connected with the outlet conduit by a bridge conduit or other shaped connection.

At 704, particles in the air are removed from the air by passing the air through a filter medium. The filter medium may be separate from the filter housing and disposed inside the housing, and/or the filter housing may be at least partially formed from the filter medium. Over time, the filter medium may become at least partially clogged or filled with particles, and may prevent or significantly impede the flow of air through the filter housing.

At 706, the particles are separated from the air using momentum of the particles while allowing the air to flow around the filter medium and the filter housing. This can occur responsive to the filter medium becoming clogged. For example, the momentum of the particles may carry the particles into the filter housing while the air passes around, and not through, the filter housing, as described above.

In one embodiment, a virtual impactor filter assembly includes a filter housing configured to hold a filter material and defining an interior chamber. The filter housing includes an inlet opening positioned relative to an outer air flow housing that directs a flow of air having particles along a flow direction into the interior chamber of the filter housing through the inlet opening. The filter housing is configured to engage with the outer air flow housing such that the filter housing is separated from the outer air flow housing along the flow direction to permit at least some of the air to pass around an exterior of the filter housing and exit the outer air flow housing while the particles in the at least some of the air pass into the interior chamber of the filter housing through the inlet opening.

In one aspect, the filter housing is configured to engage with the outer air flow housing such that the filter housing is separated from the outer air flow housing along the flow direction by an air gap.

In one aspect, the assembly also includes a bridge conduit configured to extend from an outlet opening of the outer air flow housing through which the air is directed toward the filter housing to the inlet opening of the filter housing. The bridge conduit can include openings that allow the air to flow out of the bridge conduit prior to reaching the inlet opening of the filter housing and around the filter housing.

In one aspect, the filter housing is configured to capture and remove the particles in the at least some of the air without decreasing the flow of the air through or around the filter housing after clogging of the filter material.

In one aspect, the filter housing is separated from the outer air flow housing by a distance that is a sufficiently large to allow the air to flow around the filter housing but that is sufficiently small to cause momentum of the particles in the air to enter into the filter housing through the inlet opening of the filter housing.

In one aspect, the filter housing includes a backflow prevention conduit extending inward from the inlet opening of the filter housing. The backflow prevention conduit can prevent backflow of the at least some of the particles out of the filter housing via the inlet opening.

In one aspect, the filter housing also includes one or more exit openings configured to pass the air out of the filter housing after capturing at least some of the particles in the interior chamber of the filter housing with the filter material.

In one aspect, the filter housing includes one or more sidewalls and an end wall that opposes the inlet opening of the filter housing. The end wall includes an angled impingement surface configured to evenly distribute the particles in the at least some of the air entering into the filter housing along the one or more sidewalls.

In one aspect, the angled impingement surface has a conical shape.

In one aspect, the filter housing is configured to be positioned in an engine system to receive the flow of the air directed into a turbine prior to the air reaching the turbine.

In one aspect, the filter housing is configured to be engaged with the outer air flow housing such that the filter housing is laterally spaced apart from the outer air flow housing in directions that are transversely oriented with respect to the flow direction of the flow of the air.

In one embodiment, a filter system includes a filter housing and an outer air flow housing. The filter housing defines an interior chamber and includes an inlet opening extending into the interior chamber. The outer air flow housing has an outlet conduit through which a flow of air having particles is directed toward the inlet opening of the filter housing along a flow direction toward the interior chamber of the filter housing. The outer air flow housing engages the filter housing such that the filter housing is separated from the outer air flow housing along the flow direction to permit at least some of the air to pass around an exterior of the filter housing and exit the outer air flow housing while the particles in the at least some of the air pass into the interior chamber of the filter housing through the inlet opening.

In one aspect, the filter housing engages the outer air flow housing such that the filter housing is separated from the outer air flow housing along the flow direction by an air gap.

In one aspect, the system also includes a bridge conduit configured to extend from an outlet opening of the outlet conduit to the inlet opening of the filter housing. The bridge conduit includes openings that allow the air to flow out of the bridge conduit prior to reaching the inlet opening of the filter housing and around the filter housing.

In one aspect, the filter housing engages the outer air flow housing to capture and remove the particles in the at least some of the air without decreasing the flow of the air through or around the filter housing after clogging of filter material in the filter housing.

In one aspect, the filter housing inlet is separated from the outer air flow housing by a distance that is a sufficiently large to allow the air to flow around the filter housing but that is sufficiently small to cause momentum of the particles in the air to enter into the filter housing through the inlet opening of the filter housing.

In one aspect, the filter housing includes a backflow prevention conduit extending inward from the inlet opening of the filter housing. The backflow prevention conduit can prevent backflow of the at least some of the particles out of the filter housing via the inlet opening.

In one aspect, the filter housing also includes one or more exit openings configured to pass the air out of the filter housing after capturing at least some of the particles in the interior chamber of the filter housing.

In one aspect, the filter housing includes one or more sidewalls and an end wall that opposes the inlet opening of the filter housing. The end wall can include an angled impingement surface configured to evenly distribute the particles in the at least some of the air entering into the filter housing along the one or more sidewalls.

In one aspect, the angled impingement surface has a conical shape.

In one aspect, the filter housing is configured to be positioned in an engine system to receive the flow of the air directed into a turbine prior to the air reaching the turbine.

In one aspect, the filter housing is configured to be engaged with the outer air flow housing such that the filter housing is laterally spaced apart from the outer air flow housing in directions that are transversely oriented with respect to the flow direction of the flow of the air.

In one aspect, the outlet tube of the outer air flow housing is aligned with the inlet opening of the filter housing along the flow direction.

In one aspect, the outlet conduit of the outer air flow housing is elongated and staged in inner diameter such that a first stage of the outlet conduit has a larger inner diameter than a second stage of the outlet conduit with the second stage being located closer to the filter housing than the first stage.

In one aspect, the system also includes a cap that engages with the outer air flow housing to enclose the filter housing between the cap and the outer air flow housing. Alternatively, the system may not include the cap.

In one aspect, the cap includes an end wall that faces away from the outlet tube of the outer air flow housing and one or more outer surfaces that extend around the end wall. At least one of the end wall or the one or more outer surfaces can include one or more holes to permit the air to exit out of the outer air flow housing and the cap.

In one embodiment, a method includes receiving a flow of air having particles from an outer air flow housing along a flow direction. The flow of air is directed toward an inlet opening of a filter housing that directs the particles into the filter housing. The method also can include removing at least some of the particles from the flow of air by passing the air through a filter medium inside the filter housing and, responsive to the filter medium becoming laden with the particles such that the flow of air through the filter medium would be reduced, separating the particles from the flow of air such that momentum of the particles along the flow direction from the outer air flow housing carries the particles into the filter housing while the flow of air passes outside of the filter housing.

In one aspect, separating the particles from the flow of air causes the filter medium to capture and remove the particles in at least some of the air without decreasing the flow of the air through or around the filter housing.

In one aspect, the method also can include preventing backflow of the particles out of the filter housing via the inlet opening.

In one aspect, the method also includes evenly distributing the particles in the air entering into the filter housing along one or more sidewalls of the filter housing by directing the particles toward an angled impingement surface inside the filter housing.

In one aspect, removing at least some of the particles from the flow of air and, responsive to the filter medium becoming laden with the particles, separating the particles from the flow of air occurs prior to directing the air without the particles into a turbine of an engine system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A virtual impactor filter assembly comprising:
   a filter housing having a cylindrical sidewall defining an interior chamber, the filter housing including an inlet opening spaced a separation distance from an outer air flow housing that directs a flow of air having particles along a flow direction into the interior chamber of the filter housing through the inlet opening, the cylindrical sidewall including a plurality of exit openings extending therethrough;
   a filter medium disposed in the interior chamber of the filter housing along an inner surface of the cylindrical sidewall, the filter medium removing particles from the flow of air having particles to provide a filtered air flow that exits the filter housing through the plurality of exit openings; and
   a volume defined between the filter housing and the outer air flow housing along the flow direction to permit at least some of the flow of air to flow, via the separation distance, through the volume and pass around an exterior of the filter housing, and exit the outer air flow housing while the particles in the at least some of the flow of air pass into the interior chamber of the filter housing through the inlet opening wherein the filter housing is configured to engage with the outer air flow housing such that the filter housing is separated from the outer air flow housing along the flow direction by an air gap.

2. The virtual impactor filter assembly of claim 1, further comprising a bridge conduit configured to extend from an outlet opening of the outer air flow housing through which the air is directed toward the filter housing to the inlet opening of the filter housing, the bridge conduit including openings that allow the air to flow out of the bridge conduit prior to reaching the inlet opening of the filter housing and around the filter housing.

3. The virtual impactor filter assembly of claim 1, wherein the filter housing is configured to capture and remove the particles in the at least some of the air without decreasing the flow of the air through or around the filter housing after clogging of the filter medium.

4. The virtual impactor filter assembly of claim 1, wherein the filter housing includes a backflow prevention conduit disposed within the interior chamber and extending inward from the inlet opening of the filter housing, the backflow prevention conduit preventing backflow of the at least some of the particles out of the filter housing via the inlet opening.

5. The virtual impactor filter assembly of claim 1, wherein the filter housing includes an end wall that opposes the inlet opening of the filter housing, the end wall including an angled impingement surface configured to evenly distribute the particles in the at least some of the air entering into the filter housing along the cylindrical sidewall.

6. The virtual impactor filter assembly of claim 1, wherein the filter housing is configured to be engaged with the outer air flow housing such that the filter housing is laterally spaced apart from the outer air flow housing in directions that are transversely oriented with respect to the flow direction of the flow of the air.

7. A filter system comprising:
   a filter housing having a cylindrical sidewall defining an interior chamber, the filter housing having an inlet opening extending into the interior chamber, the cylindrical sidewall including a plurality of exit openings extending therethrough;
   a filter medium disposed in the interior chamber of the filter housing along an inner surface of the cylindrical sidewall; and
   an outer air flow housing having an outlet conduit through which a flow of air having particles is directed toward the inlet opening of the filter housing along a flow direction toward the interior chamber of the filter housing, the outer air flow housing spaced a separation distance from the inlet opening of the filter housing; and
   a volume defined between the filter housing and the outer air flow housing along the flow direction to permit at least some of the flow of air to flow, via the separation distance, through the volume and pass around an exterior of the filter housing, and exit the outer air flow housing while the particles in the at least some of the flow of air pass into the interior chamber of the filter housing through the inlet opening, and wherein the filter medium removes particles from the flow of air to provide a filtered air flow that exits the filter housing through the plurality of exit openings wherein the filter housing engages the outer air flow housing such that the filter housing is separated from the outer air flow housing along the flow direction by an air gap.

8. The filter system of claim 7, further comprising a bridge conduit configured to extend from an outlet opening of the outlet conduit to the inlet opening of the filter housing, the bridge conduit including openings that allow the air to flow out of the bridge conduit prior to reaching the inlet opening of the filter housing and around the filter housing.

9. The filter system of claim 8, wherein the filter housing includes an end wall that opposes the inlet opening of the filter housing, the end wall including an angled impingement surface configured to evenly distribute the particles in the at least some of the air flow entering into the filter housing along the cylindrical sidewall.

10. The filter system of claim 7, wherein the filter housing engages the outer air flow housing to capture and remove the particles in the at least some of the air without decreasing the flow of the air through or around the filter housing after clogging of filter material in the filter housing.

11. The filter system of claim 7, wherein the filter housing includes a backflow prevention conduit disposed within the interior chamber and extending inward from the inlet opening of the filter housing, the backflow prevention conduit preventing backflow of the at least some of the particles out of the filter housing via the inlet opening.

12. The filter system of claim 7, wherein the outlet conduit of the outer air flow housing is elongated and staged in inner diameter such that a first stage of the outlet conduit has a larger inner diameter than a second stage of the outlet conduit with the second stage being located closer to the filter housing than the first stage.

13. A virtual impactor filter assembly comprising:
a filter housing having a cylindrical sidewall defining an interior chamber, the filter housing including an inlet opening positioned relative to an outer air flow housing that directs a flow of air having particles along a flow direction into the interior chamber of the filter housing through the inlet opening, the cylindrical sidewall including a plurality of exit openings extending therethrough;
a filter medium disposed in the interior chamber of the filter housing along an inner surface of the cylindrical sidewall, the filter medium removing particles from the flow of air having particles to provide a filtered air flow that exits the filter housing through the plurality of exit openings; and
a bridge conduit configured to extend from an outlet opening of the outer air flow housing through which the air is directed toward the filter housing to the inlet opening of the filter housing, the bridge conduit including openings that allow the air to flow out of the bridge conduit prior to reaching the inlet opening of the filter housing and around the filter housing,
wherein the filter housing is separated from the outer air flow housing along the flow direction to permit at least some of the flow of air to pass around an exterior of the filter housing, and exit the outer air flow housing while the particles in the at least some of the air pass into the interior chamber of the filter housing through the inlet opening.

14. The virtual impactor filter assembly of claim 13, wherein the filter housing is configured to capture and remove the particles in the at least some of the air without decreasing the flow of the air through or around the filter housing after clogging of the filter medium.

15. The virtual impactor filter assembly of claim 13, wherein the filter housing includes a backflow prevention conduit disposed within the interior chamber and extending inward from the inlet opening of the filter housing, the backflow prevention conduit preventing backflow of the at least some of the particles out of the filter housing via the inlet opening.

16. The virtual impactor filter assembly of claim 13, wherein the filter housing includes an end wall that opposes the inlet opening of the filter housing, the end wall including an angled impingement surface configured to evenly distribute the particles in the at least some of the air entering into the filter housing around the interior chamber.

17. The virtual impactor filter assembly of claim 13, wherein the filter housing is configured to be engaged with the outer air flow housing such that the filter housing is laterally spaced apart from the outer air flow housing in directions that are transversely oriented with respect to the flow direction of the flow of the air.

* * * * *